United States Patent
Kojukhov et al.

(10) Patent No.: US 11,963,200 B2
(45) Date of Patent: Apr. 16, 2024

(54) SYSTEM, METHOD, AND COMPUTER PROGRAM FOR RESOURCE ORCHESTRATION IN A 5G NETWORK BASED ON USER EQUIPMENT BEHAVIOR ANALYSTICS

(71) Applicant: Amdocs Development Limited, Limassol (CY)

(72) Inventors: Andrei Kojukhov, Rishon le Zion (IL); Alla Goldner, Tel Aviv (IL); Tzvika Naveh, Herzeliya (IL); Avi Chapnick, Ramat Gan (IL); Borislav Glozman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/196,814

(22) Filed: Mar. 9, 2021

(65) Prior Publication Data
US 2022/0295471 A1  Sep. 15, 2022

(51) Int. Cl.
*H04W 72/51* (2023.01)
*H04W 76/10* (2018.01)
*H04W 76/11* (2018.01)

(52) U.S. Cl.
CPC ......... *H04W 72/51* (2023.01); *H04W 76/10* (2018.02)

(58) Field of Classification Search
CPC ... H04W 72/048; H04W 72/04; H04W 76/10; H04W 12/104; H04W 4/02; H04W 36/305; H04W 40/20; H04W 48/04; H04W 28/02
See application file for complete search history.

(56) References Cited

U.S. PATENT DOCUMENTS

| | | | |
|---|---|---|---|
| 11,445,402 B1* | 9/2022 | Saha | H04W 24/10 |
| 11,477,827 B2* | 10/2022 | Kojukhov | H04L 41/0894 |
| 2018/0054845 A1* | 2/2018 | Lee | H04W 48/14 |
| 2020/0136978 A1 | 4/2020 | Li et al. | |
| 2020/0280822 A1 | 9/2020 | Stammers et al. | |
| 2020/0296653 A1 | 9/2020 | Huang | |
| 2020/0344576 A1 | 10/2020 | Li et al. | |

(Continued)

FOREIGN PATENT DOCUMENTS

| WO | 2018215046 A1 | 11/2018 |
|---|---|---|
| WO | 2020109853 A1 | 6/2020 |

(Continued)

OTHER PUBLICATIONS

International Search Report and Written Opinion from PCT Application No. PCT/IB2022/051971, dated May 25, 2022.

*Primary Examiner* — Khawar Iqbal
(74) *Attorney, Agent, or Firm* — Zilka-Kotab, P.C.

(57) ABSTRACT

As described herein, a system, method, and computer program are provided for orchestrating resources in a 5G network based on user equipment behavior analytics. A policy control function in the 5G network collects analytic information associated with past behavior of user equipment in a 5G network. The policy control function predicts future behavior of the user equipment in the 5G network, based on the analytic information. The policy control function generates one or more policy decisions based on the future behavior of the user equipment, wherein the one or more policy decisions cause an orchestration function of the 5G network to orchestrate resources within the 5G network for use by the user equipment.

19 Claims, 4 Drawing Sheets

(56) References Cited

U.S. PATENT DOCUMENTS

| | | | | |
|---|---|---|---|---|
| 2021/0105784 A1* | 4/2021 | Young | ............... | H04W 72/53 |
| 2021/0127302 A1* | 4/2021 | Young | ............... | H04W 76/36 |
| 2021/0392540 A1* | 12/2021 | Chong | ............. | H04W 28/0268 |
| 2022/0201543 A1* | 6/2022 | Zhu | ................ | H04W 28/0925 |
| 2022/0240158 A1* | 7/2022 | Zhu | ................ | H04W 16/04 |
| 2022/0248287 A1* | 8/2022 | Chong | ............. | H04W 36/0058 |
| 2022/0264428 A1* | 8/2022 | Li | .................... | H04W 28/0226 |
| 2022/0353730 A1* | 11/2022 | Saha | .................... | H04W 24/10 |
| 2022/0408340 A1* | 12/2022 | Paczkowski | .......... | H04W 40/20 |
| 2023/0090022 A1* | 3/2023 | Han | ................ | H04L 41/5058 |
| | | | | 370/329 |
| 2023/0188475 A1* | 6/2023 | Wang | ................ | H04W 72/04 |
| | | | | 709/226 |
| 2023/0231787 A1* | 7/2023 | Huang | ............... | H04L 43/0823 |
| | | | | 709/224 |

FOREIGN PATENT DOCUMENTS

| | | | |
|---|---|---|---|
| WO | 2020168321 | A1 | 8/2020 |
| WO | 2020178013 | A1 | 9/2020 |
| WO | 2020178014 | A1 | 9/2020 |
| WO | 2021009539 | A1 | 1/2021 |

\* cited by examiner

SYSTEM, METHOD, AND COMPUTER PROGRAM FOR RESOURCE ORCHESTRATION IN A 5G NETWORK BASED ON USER EQUIPMENT BEHAVIOR ANALYSTICS

FIELD OF THE INVENTION

The present invention relates to resource orchestration in a 5G network.

BACKGROUND

The new policy requirements specified in 3GPP TS 23.503 (sub-clause 4.2) for 5G systems allows non-session management related policy control. Access and mobility related policy control for user equipment is enforced by Policy Control Function (PCF) interaction with access and mobility policy enforcement in the Access Management Function (AMF) allowing the PCF to have the information about user equipment mobility statistics and predicting the user equipment movement pattern. In addition, the new policy requirement specifies that the PCF shall be able to collect directly slice specific network status analytic information from the 5G network. PCF shall be able to use that data in its policy decisions.

To date, this new non-session management related policy control has not been leveraged to improve resource orchestration in the 5G network. There is thus a need for addressing these and/or other issues associated with the prior art.

SUMMARY

As described herein, a system, method, and computer program are provided for orchestrating resources in a 5G network based on user equipment behavior analytics. A policy control function in the 5G network collects analytic information associated with past behavior of user equipment in a 5G network. The policy control function predicts future behavior of the user equipment in the 5G network, based on the analytic information. The policy control function generates one or more policy decisions based on the future behavior of the user equipment, wherein the one or more policy decisions cause an orchestration function of the 5G network to orchestrate resources within the 5G network for use by the user equipment.

DETAILED DESCRIPTION

Figure 1:
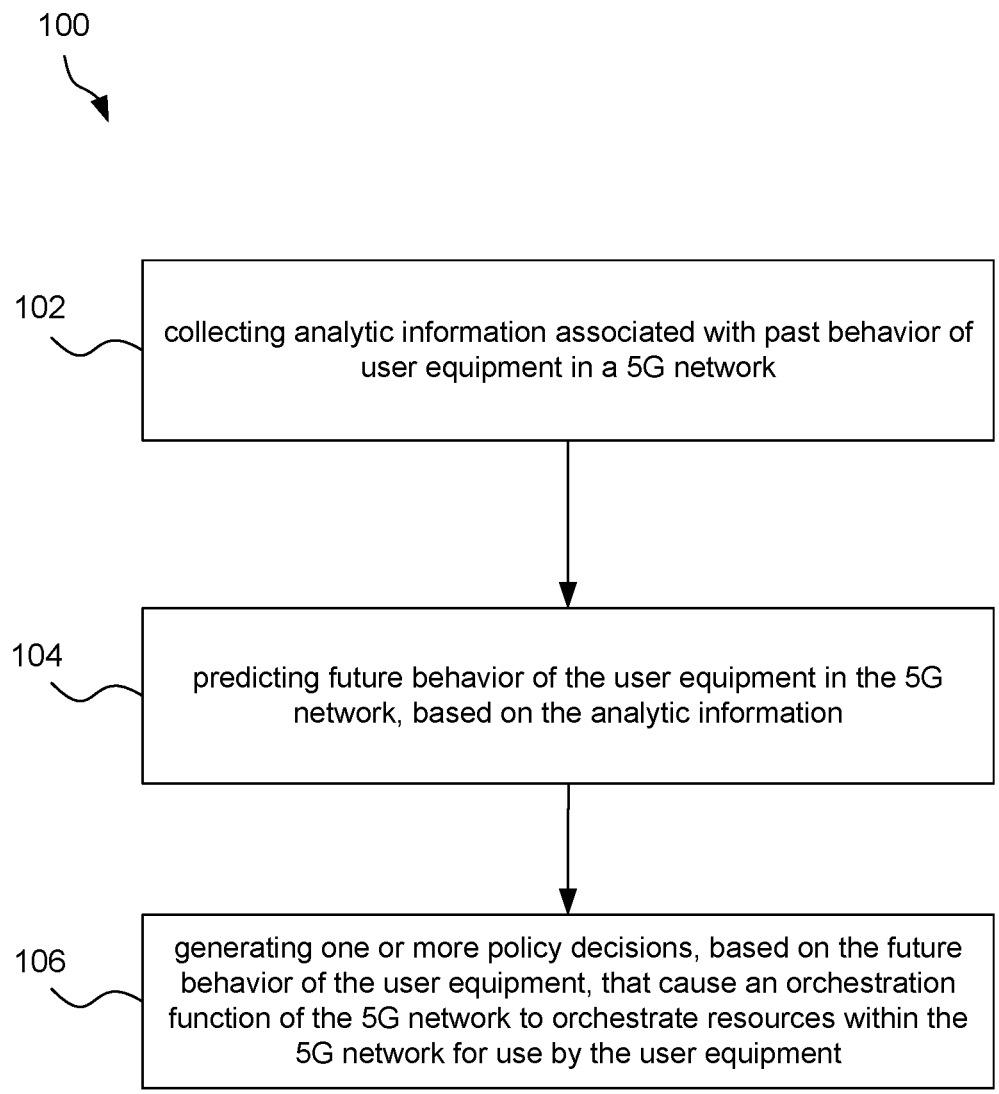
FIG. 1 illustrates a method for orchestrating resources in a 5G network based on user equipment behavior analytics, in accordance with one embodiment.

FIG. 1 illustrates a method 100 for orchestrating resources in a 5G network based on user equipment behavior analytics, in accordance with one embodiment. The method 100 is performed by a policy control function in the 5G network. The policy control function may be executed by any computer system within a 5G network, such as those described below with reference to FIGS. 3 and/or 4. In general, the policy control function operates to made policy decisions regarding resource orchestration within the 5G network.

In operation 102, analytic information associated with past behavior of user equipment in a 5G network is collected. The user equipment may be any user owned and/or operated device with a 5G connection capability. For example, the user equipment may be a mobile phone.

In one embodiment, the analytic information may be collected from an access management function in the 5G network. As an option, the analytic information may be specific to a slice of the 5G network. The past behavior of user equipment may include past mobility (e.g. movement, handovers, etc.) of the user equipment within the 5G network, for example. To this end, the analytic information may include statistics associated with the past mobility of the user equipment within the 5G network.

In operation 104, future behavior of the user equipment in the 5G network is predicted, based on the analytic information. The future behavior of the user equipment may include future mobility of the user equipment within the 5G network. The future behavior may be predicted using any defined algorithm, such as a machine learning algorithm trained to make predictions of user equipment behavior within the 5G network based on past user equipment behavior within the 5G network.

In operation 106, one or more policy decisions are generated based on the future behavior of the user equipment, wherein the one or more policy decisions cause an orchestration function of the 5G network to orchestrate resources within the 5G network for use by the user equipment. In general, the orchestration function operates to place 5G network functions and applications (e.g. user equipment consumed applications) in data centers of the 5G network. The resources may include network functions and/or applications capable of being consumed by the user equipment.

In one embodiment, the one or more policy decisions may include placement of the resources within the 5G network. Such placement may refer to selection of one or more data centers within the 5G network on which to place, or home, the resources. In another embodiment, the one or more policy decisions may include scaling of the resources within the 5G network. The scaling may include scaling up the resources within the 5G network and/or scaling down the resources within the 5G network.

As noted above, the one or more policy decisions cause the orchestration function of the 5G network to orchestrate the resources within the 5G network for use by the user equipment. In one embodiment, the one or more policy decisions may be sent (by the policy control function) to the orchestration function to cause the orchestration function to orchestrate the resources within the 5G network for use by the user equipment.

In this way, the method 100 may be used by the policy control function to orchestrate resources in the 5G network based on user equipment behavior analytics. In turn, the user equipment may be influenced to attach to a particular access within the 5G network having available resources for use by the user equipment, as described in more detail below with reference to FIG. 2. The method 100 may be used for all user equipment associated with the 5G network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
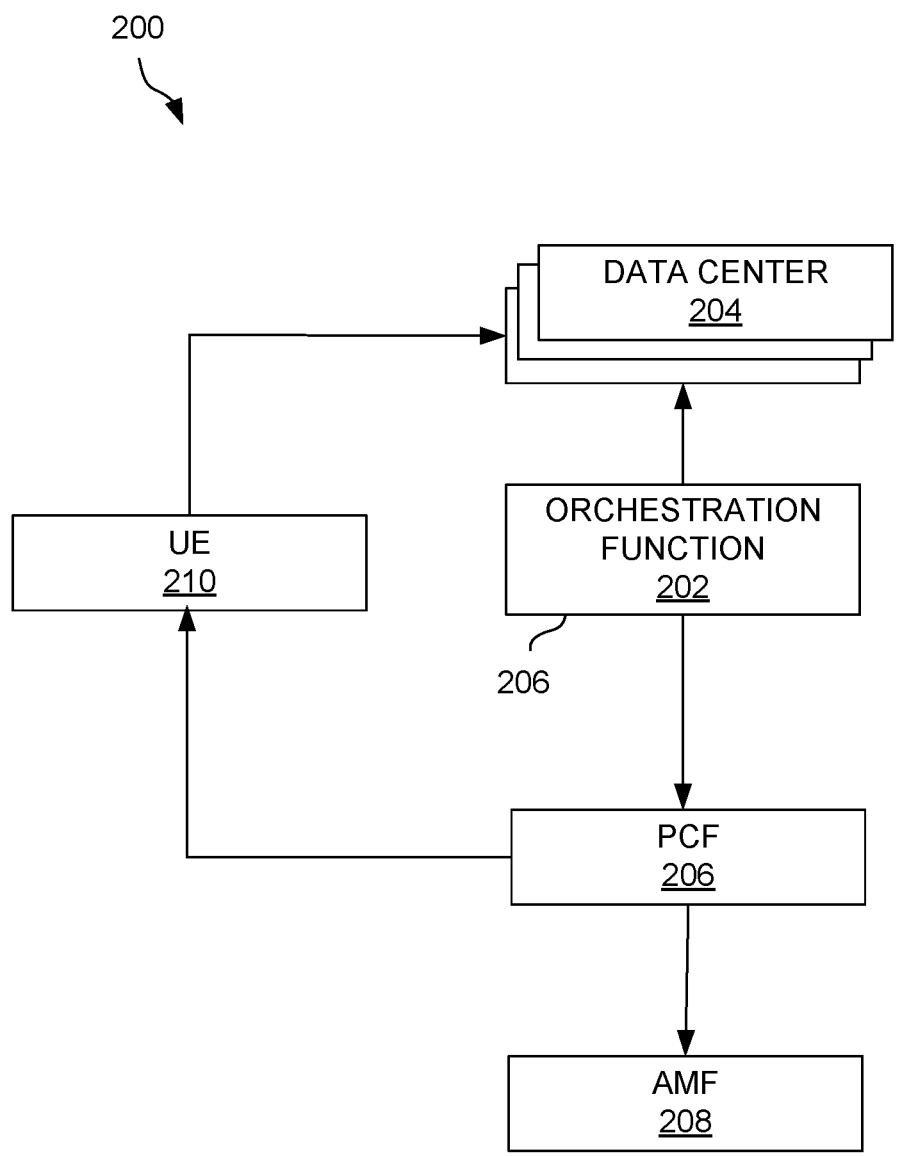
FIG. 2 illustrates a system flow diagram for orchestrating resources in a 5G network based on user equipment behavior analytics, in accordance with one embodiment.

FIG. 2 illustrates a system 200 flow diagram for orchestrating resources in a 5G network based on user equipment behavior analytics, in accordance with one embodiment. As an option, the flow diagram may be implemented in the context of the details of the previous figure and/or any subsequent figure(s). For example, the system 200 may represent components of a 5G network. Of course, however, the flow diagram may be implemented in the context of any desired environment. Further, the aforementioned definitions may equally apply to the description below.

The 5G policy control function (PCF) 206 collects analytic information associated with past behavior of user equipment (UE) 210 in a 5G network from the 5G access management function (AMF) 208. The PCF 206 predicts future behavior of the UE 210 in the 5G network, based on the analytic information. The PCF 206 generates one or more policy decisions based on the future behavior of the user equipment, wherein the one or more policy decisions cause an orchestration function 202 of the 5G network to orchestrate resources within the 5G network for use by the UE 210.

The PCF 206 collects directly slice specific network status analytic information from 5G Network. This is enabled by the new policy requirements specified in 3GPP TS 23.503 (sub-clause 4.2) which allows non-session management related policy control.

The PCF 206 uses the analytic information in generating its policy decisions, such as:

1. Resource placement (e.g. specific network functions and/or applications in edge and/or centralized data centers 204 and private and/or public clouds.
2. Resource scaling up/down.

In turn, the UE 210 is handled by a location with available resources to allocate applications to be consumed by the UE 210. The UE 210 handling is described in more detail in U.S. application Ser. No. 17/196,791, filed herewith and entitled "SYSTEM, METHOD, AND COMPUTER PROGRAM FOR USER EQUIPMENT HANDLING IN A 5G NETWORK BASED ON AVAILABLE RESOURCES," which is incorporated by reference in its entirety. For example, the PCF is advised by the orchestration function 202 to associate the UE 210 to a specific access, such as a 3rd Generation Partnership Project (3GPP) or non-3GPP (e.g. WiFi, etc.), a specific radio access network (RAN)/core in 3GPP access, and a specific data center location within the 5G network. This is also enabled by the new policy requirements specified in 3GPP TS 23.503 (sub-clause 4.2) which allows non-session management related policy control including:

(1) Access and mobility related policy control requirements—Policy Control Function (PCF) shall support interactions with the access and mobility policy enforcement in the AMF, through service-based interfaces; and
(2) UE access selection and PDU Session selection related policy (UE policy) control requirements—The 5GC shall be able to provide policy information from the PCF to the UE.

Accordingly, the orchestration function 202 may operate to identify a connection to be established with the 5G network by the UE 210, determine a data center 204 in the 5G network having the resources for use by the UE 210, generate access related information to be used by the UE 210 for establishing the connection with the data center 204, and send to the PCF 206 the access related information to be used to establish the connection between the UE 210 and the 5G network. The PCF 206 may then communicate policy information to the UE 210 to cause the UE 210 to establish the connection to the 5G network according to the access related information.

To this end, as described above, the 5G orchestration function 202 is guided by the PCF 206 statistics and prediction about UE 210 behavior. That allows the orchestration function 202 to provide placement decisions for resources (network functions and applications) consumed by the UE 210. The resources orchestration (instantiating, scaling up/down, etc.) is provided right on time when the UE 210 is about to consume the resources.

Figure 3:
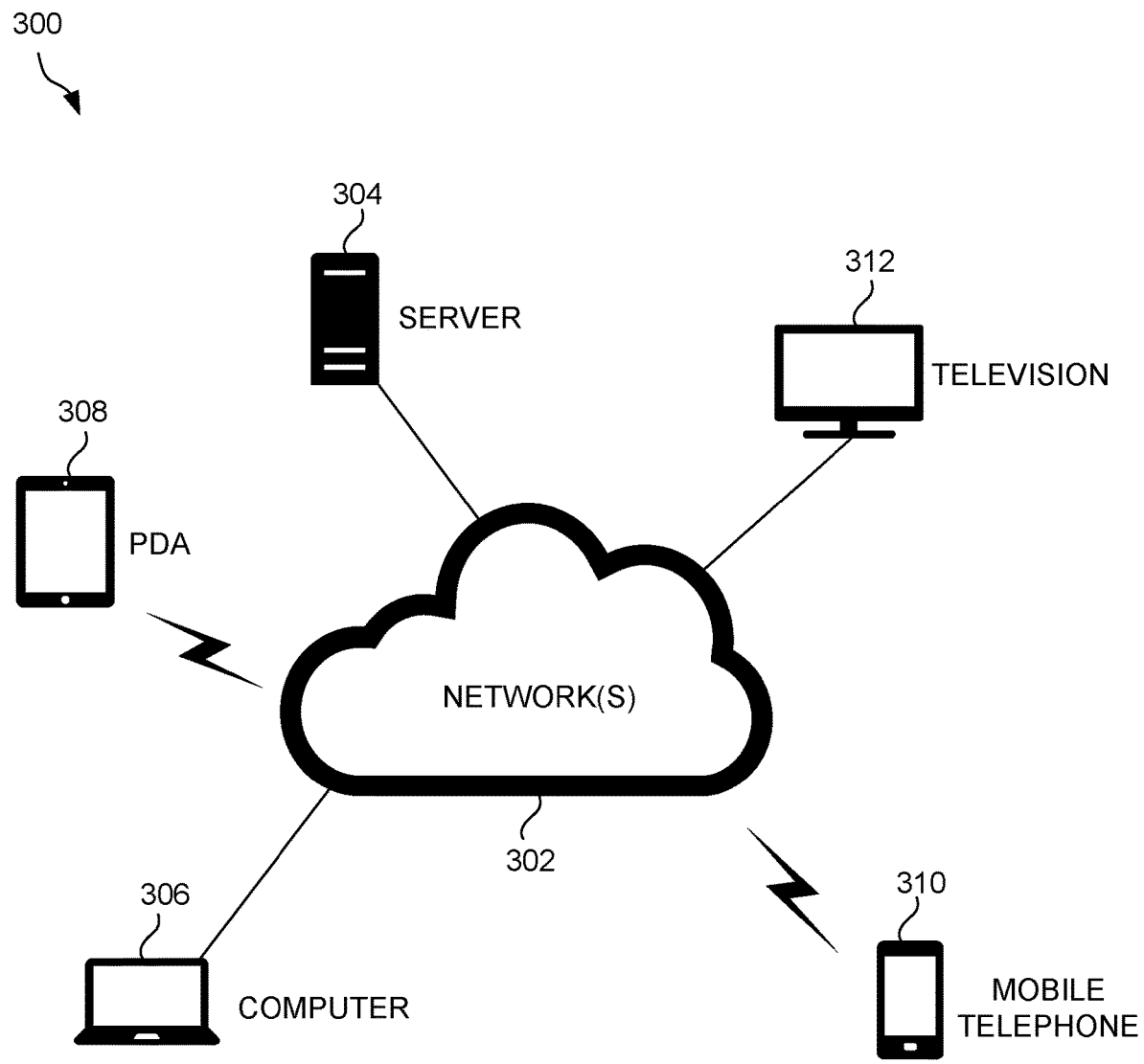
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
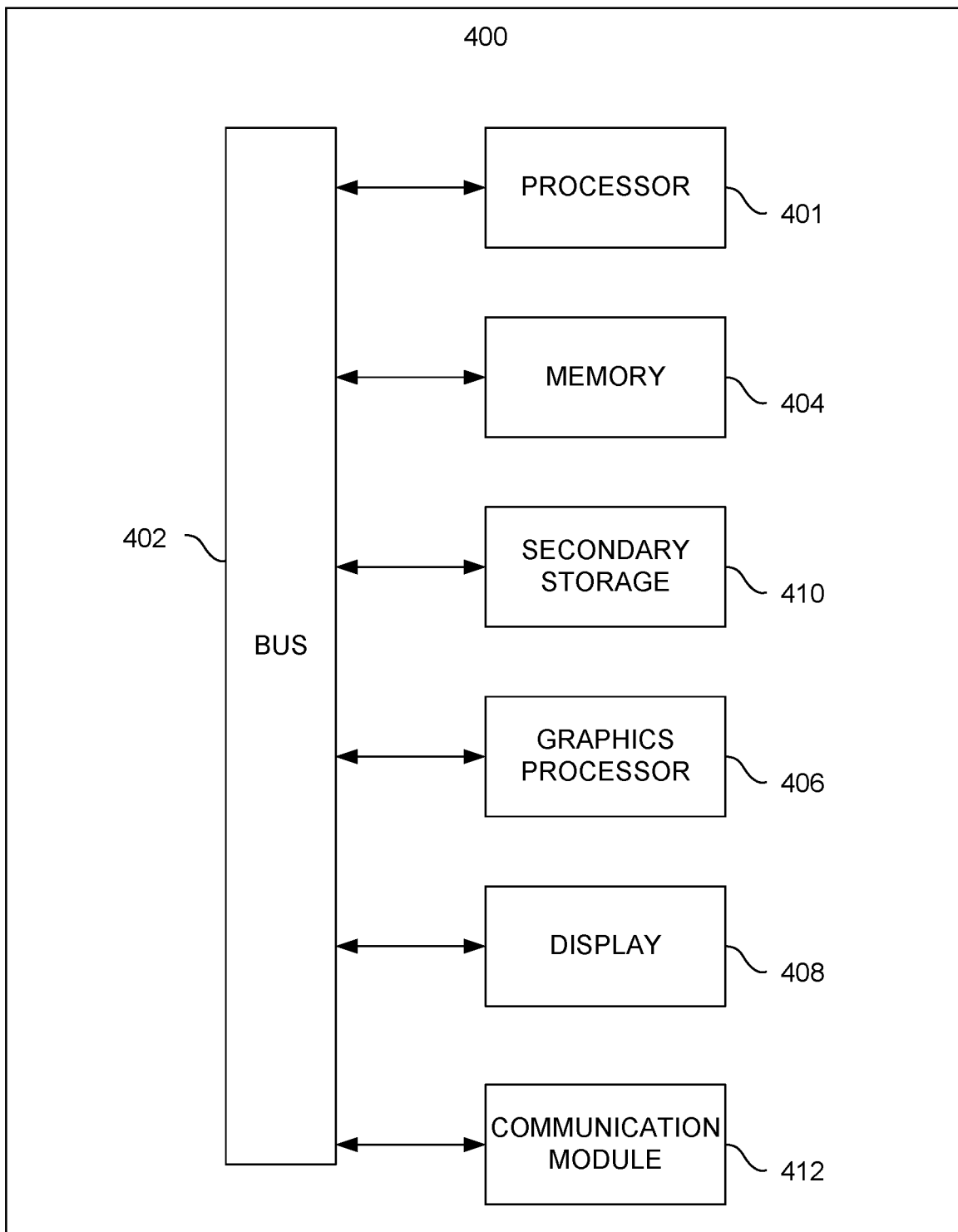
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   collecting, by a policy control function in a 5G network, analytic information associated with past behavior of a particular user equipment in a 5G network;
   predicting, by the policy control function, future behavior of the particular user equipment in the 5G network, based on the analytic information; and
   generating, by the policy control function, one or more policy decisions based on the future behavior of the particular user equipment, wherein the one or more policy decisions cause an orchestration function of the 5G network to orchestrate at least one of network functions or applications within the 5G network for use by the particular user equipment including to at least one of:

place the at least one of network functions or applications on a select one or more data centers within the 5G network for use by the particular user equipment, or scale the at least one of network functions or applications within the 5G network for use by the particular user equipment;

wherein the policy control function generates policy decisions on a per user equipment basis such that the at least one of network functions or applications within the 5G network are orchestrated by the orchestration function on a per user equipment basis.

2. The non-transitory computer readable medium of claim 1, wherein the analytic information is collected from an access management function in the 5G network.

3. The non-transitory computer readable medium of claim 1, wherein the past behavior of the particular user equipment includes past mobility of the particular user equipment within the 5G network.

4. The non-transitory computer readable medium of claim 3, wherein the analytic information includes statistics associated with the past mobility of the particular user equipment within the 5G network.

5. The non-transitory computer readable medium of claim 4, wherein the analytic information is specific to a slice of the 5G network.

6. The non-transitory computer readable medium of claim 1, wherein the future behavior of the particular user equipment includes future mobility of the particular user equipment within the 5G network.

7. The non-transitory computer readable medium of claim 1, wherein the at least one of network functions or applications include the network functions.

8. The non-transitory computer readable medium of claim 1, wherein the at least one of network functions or applications include the applications.

9. The non-transitory computer readable medium of claim 1, further comprising:

sending the one or more policy decisions to the orchestration function to cause the orchestration function to orchestrate the at least one of network functions or applications within the 5G network for use by the particular user equipment.

10. The non-transitory computer readable medium of claim 1, wherein the orchestration function further:

identifies a connection to be established with the 5G network by the particular user equipment, determines a data center in the 5G network having the at least one of network functions or applications for use by the particular user equipment, generates access related information to be used by the particular user equipment for establishing the connection with the data center, and sends to the policy control function the access related information to be used to establish the connection between the particular user equipment and the 5G network.

11. The non-transitory computer readable medium of claim 10, wherein the policy control function communicates policy information to the particular user equipment to cause the user equipment to establish the connection to the 5G network according to the access related information.

12. The non-transitory computer readable medium of claim 1, wherein scaling the at least one of network functions or applications includes scaling up the at least one of network functions or applications within the 5G network or scaling down the at least one of network functions or applications within the 5G network.

13. The non-transitory computer readable medium of claim 1, wherein the at least one of network functions or applications are orchestrated for use by the particular user equipment when the particular user equipment is about to consume the at least one of network functions or applications via an established connection to the 5G network.

14. The non-transitory computer readable medium of claim 1, wherein the one or more policy decisions cause an orchestration function of the 5G network to place the at least one of network functions or applications on the select one or more data centers within the 5G network for use by the particular user equipment.

15. The non-transitory computer readable medium of claim 1, wherein the one or more policy decisions cause an orchestration function of the 5G network to scale the at least one of network functions or applications within the 5G network for use by the particular user equipment.

16. A method, comprising:

collecting, by a policy control function in a 5G network, analytic information associated with past behavior of a particular user equipment in a 5G network;

predicting, by the policy control function, future behavior of the particular user equipment in the 5G network, based on the analytic information; and generating, by the policy control function, one or more policy decisions based on the future behavior of the particular user equipment, wherein the one or more policy decisions cause an orchestration function of the 5G network to orchestrate at least one of network functions or applications within the 5G network for use by the particular user equipment including to at least one of:

place the at least one of network functions or applications on a select one or more data centers within the 5G network for use by the particular user equipment, or scale the at least one of network functions or applications within the 5G network for use by the particular user equipment;

wherein the policy control function generates policy decisions on a per user equipment basis such that the at least one of network functions or applications within the 5G network are orchestrated by the orchestration function on a per user equipment basis.

17. The method of claim 16, wherein the analytic information is collected from an access management function in the 5G network.

18. The method of claim 16, further comprising:

sending the one or more policy decisions to the orchestration function to cause the orchestration function to orchestrate the at least one of network functions or applications within the 5G network for use by the particular user equipment.

19. A system, comprising:

a non-transitory memory storing instructions; and one or more processors in communication with the non-transitory memory that execute the instructions to perform a method comprising:

collecting, by a policy control function in a 5G network, analytic information associated with past behavior of a particular user equipment in a 5G network;

predicting, by the policy control function, future behavior of the particular user equipment in the 5G network, based on the analytic information; and generating, by the policy control function, one or more policy decisions based on the future behavior of the particular user equipment, wherein the one or more policy decisions cause an orchestration function of the 5G network to orchestrate at least one of network functions or applications within the 5G network for use by the particular user equipment including to at least one of:

place the at least one of network functions or applications on a select one or more data centers within the 5G network for use by the particular user equipment, or scale the at least one of network functions or applications within the 5G network for use by the particular user equipment;

wherein the policy control function generates policy decisions on a per user equipment basis such that the at least one of network functions or applications within the 5G network are orchestrated by the orchestration function on a per user equipment basis.

\* \* \* \* \*